(12) United States Patent
Kim et al.

(10) Patent No.: US 9,042,221 B2
(45) Date of Patent: May 26, 2015

(54) METHOD OF CONTROLLING CONGESTION OF MTC DATA IN A MOBILE COMMUNICATION SYSTEM

(75) Inventors: Taehyeon Kim, Anyang-si (KR); Laeyoung Kim, Anyang-si (KR); Saso Stojanovski, Paris (FR); Hyunsook Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 103 days.

(21) Appl. No.: 13/643,981

(22) PCT Filed: Apr. 28, 2011

(86) PCT No.: PCT/KR2011/003165
§ 371 (c)(1),
(2), (4) Date: Nov. 7, 2012

(87) PCT Pub. No.: WO2011/136589
PCT Pub. Date: Nov. 3, 2011

(65) Prior Publication Data
US 2013/0051228 A1    Feb. 28, 2013

Related U.S. Application Data

(60) Provisional application No. 61/329,080, filed on Apr. 28, 2010.

(51) Int. Cl.
*H04W 4/20* (2009.01)
*H04L 12/801* (2013.01)
*H04L 12/815* (2013.01)
(Continued)

(52) U.S. Cl.
CPC .............. *H04L 47/115* (2013.01); *H04L 47/22* (2013.01); *H04L 47/10* (2013.01); *H04L 47/14* (2013.01); *H04W 4/005* (2013.01); *H04W 28/0289* (2013.01); *H04W 28/0215* (2013.01)

(58) Field of Classification Search
CPC ................................ H04L 47/10; H04L 47/22
See application file for complete search history.

(56) References Cited

U.S. PATENT DOCUMENTS 7,848,269 B2 * 12/2010 Tamura et al. ............. 370/310.2
7,940,724 B2 *  5/2011 Pecen et al. .................. 370/331
8,311,553 B2 * 11/2012 Iwamura et al. ............. 455/453
(Continued)

FOREIGN PATENT DOCUMENTS

JP    WO2008/023792 A1 *  2/2008  ............. H04Q 7/26
KR         10-0798191 B1      1/2008
(Continued)

*Primary Examiner* — Jay P Patel
(74) *Attorney, Agent, or Firm* — Birch, Stewart, Kolasch & Birch, LLP (57) ABSTRACT

The present invention relates to a method for controlling traffic congestion of MTC devices in a mobile communication system which provides a machine type communication (MTC) service. The method of the present invention is configured in that a core network node (for example, MME, MSC, SGSN, etc.) performs scheduling and rescheduling procedures on data communication traffic for user equipment (that is, MTC devices) using subscription information and congestion control information of the user equipment; and generates a resultant "recalculated time interval" parameter and transmits the parameter to the user equipment, thereby efficiently distributing the amount of data communication (that is, traffic) concentrated to a specific time slot, and thus controlling traffic congestion or network overload.

10 Claims, 7 Drawing Sheets

(51) Int. Cl.
*H04W 4/00* (2009.01)
*H04W 28/02* (2009.01)

(56) References Cited

U.S. PATENT DOCUMENTS

| | | | | |
|---|---|---|---|---|
| 8,582,567 | B2* | 11/2013 | Kurapati et al. | 370/356 |
| 2007/0121596 | A1* | 5/2007 | Kurapati et al. | 370/356 |
| 2008/0043666 | A1* | 2/2008 | Tamura et al. | 370/328 |
| 2008/0239964 | A1 | 10/2008 | Mitsutake | |
| 2008/0268878 | A1* | 10/2008 | Wang et al. | 455/458 |
| 2010/0002650 | A1* | 1/2010 | Ahluwalia | 370/331 |
| 2010/0056172 | A1* | 3/2010 | Iwamura et al. | 455/453 |
| 2010/0165905 | A1* | 7/2010 | Kanazawa et al. | 370/312 |
| 2010/0197285 | A1* | 8/2010 | Horn et al. | 455/414.2 |
| 2010/0222083 | A1* | 9/2010 | Kazmi et al. | 455/458 |
| 2011/0044251 | A1* | 2/2011 | Tamura et al. | 370/328 |
| 2011/0261777 | A1* | 10/2011 | Maeda et al. | 370/329 |
| 2012/0163342 | A1* | 6/2012 | Ahluwalia | 370/331 |
| 2012/0282956 | A1* | 11/2012 | Kim et al. | 455/466 |

FOREIGN PATENT DOCUMENTS

| | | |
|---|---|---|
| KR | 10-2008-0087762 A | 10/2008 |
| KR | 10-2008-0096192 A | 10/2008 |
| KR | 10-2009-0076675 A | 7/2009 |

\* cited by examiner

METHOD OF CONTROLLING CONGESTION OF MTC DATA IN A MOBILE COMMUNICATION SYSTEM

CROSS REFERENCE TO RELATED APPLICATIONS

This application is the National Phase of PCT/KR2011/003165 filed on Apr. 28, 2011, which claims priority under 35 U.S.C. 119(e) to U.S. Provisional Application No. 61/329,080, filed on Apr. 28, 2010, all of which are hereby expressly incorporated by reference into the present application.

BACKGROUND OF THE INVENTION

1. Field of the Invention

The present invention relates to wireless communication and, more particularly, to a method and apparatus for reporting a channel state in a wireless communication system supporting multiple carriers.

2. Related Art

In order to respond various forums and new technologies relating to the fourth generation mobile communication, the 3GPP, which establishes the technical specifications of the third generation mobile communication system, begins research on long term evolution/evolved packet core (LTE/EPC) technologies from the end of 2004, as part of efforts to optimize and improve the performance of the 3GPP technologies. The EPC, which is advanced based on 3GPP SA WG2, is a study on network technology which aims to determine a structure of a network in parallel with the LTE task of 3GPP TSG RAN and support the mobility between heterogeneous networks, and is one of the important standardization issues of the latest 3GPP. This is a task aiming to develop the 3GPP system into a system supporting a variety of IP based wireless access technologies, which has been in progress in order to achieve the optimized packet-based system that minimizes transfer delay with further improved data transfer capacity.

Hereinafter, technical terms used in the description of the present invention will be described.

An MTC function is a function for supporting communication between MTC devices or communication between an MTC device and an MTC server, and means that communication is made without human intervention in the middle unlike existing person-to-person connection. For example, MTC application includes communications between automatic vending machines and servers, point of service (POS) devices and servers, and electricity and water probes and servers. Herein, a corresponding device is called an MTC device. Here, MTC is also called as the name of Machine to Machine or machine communication.

A tracking area (TA) indicates an area where E-UTRAN provides service and includes one or a plurality of E-UTRAN cells.

A routing area (RA) indicates an area where GERAN/UTRAN provides service and includes one or a plurality of GERAN/UTRAN cells.

A list of tracking area identities (TAIs) that identify the tracking areas that the UE can enter without performing a tracking area updating procedure. The TAIs in a TAI list assigned by an MME to a UE pertain to the same MME area. A detailed description on the TAI list is cited from part disclosed in standard document 3GPP TS 24.301 v9.1.0.

Mobility management entity (MME) area: the MME area is the part of the network served by an MME. An MME area consists of one or several tracking areas. All cells served by an eNodeB are included in an MME Area. A detailed description on the MME area is cited from part disclosed in standard document 3GPP TS 23.002 v9.2.0.

UMTS: is a universal mobile telecommunication system and indicates 3G network.

EPS: is an evolved packet system and is the general term for evolved packet core, various access network, and terminals, which support the LTE access network. Additionally, the EPS is the network of an evolved form of the UMTS.

NodeB: is installed in outdoor as a base station in a UMTS network and its coverage is a macro cell scale.

eNodeB: is installed in outdoor as a base station in an EPS network, and its service coverage is a micro cell scale.

UE: is User Equipment and indicates a terminal device.

IMSI: is international mobile subscriber identity and is the id of a user internationally uniquely assigned in a mobile communication network.

SIM card: is a subscriber identity module and includes user subscriber information such as IMSI.

UICC: is universal integrated circuit card and is used as the same meaning as a SIM card.

MTC: is machine type communication and indicates communication between devices without human intervention.

MTC device: is an UE performing a specific purpose with a communication function via a core network, and includes vending machines and probes, for example.

MTC server: is a server on network, which manages an MTC device and exchanges data. It may exist outside a core network.

MTC application: is actual application using an MTC device and an MTC server and includes remote metering and shipments moving track, for example.

MTC feature: according to functions or features of a network for supporting MTC application, that is, the purpose of each application, some features are required. For example, there are MTC monitoring (required for remote metering when equipment is lost) and low mobility (almost no mobility in the case of a vending machine).

RAN: is a radio access network and is the general term for 3GPP wireless access such as RNC, NodeB, and eNodeB.

Home location register (HLR)/home subscriber server (HSS): is a DB representing subscriber information in a 3GPP network.

RANAP: is an acronym for radio access network application part and indicates an interface between nodes (MME/SGSN/MSC) for controlling a RAN and a core network.

Cell camping (or camp) on state indicates a state when a terminal completes a cell selection/reselection process and selects a cell. A detailed description on this is cited from part disclosed in standard document 3GPP TS 36.304 v9.1.0.

Idle mode signaling reduction (ISR) is a service to improve the efficiency of network resources by reducing signaling for position registration when a terminal moves in different access networks such as an E-UTRAN network and a UTRAN/GERAN.

IMS centralized services (ICS) provides a stable consistent service to an IMS, regardless of an access network having a terminal attached (that is, even if it is attached to an IP-CAN and also a CS domain). A detailed description on the ICS is cited from part disclosed in standard document 3GPP TS 23.292 v9.4.0.

IP multimedia subsystem (IMS) is a system providing an IP based multimedia service.

Attach refers to that a terminal accesses a network node, and also refers to attach occurring during handover in a broader sense.

From now on, the present invention will be described referring to the above described technical terms.

Figure 1:
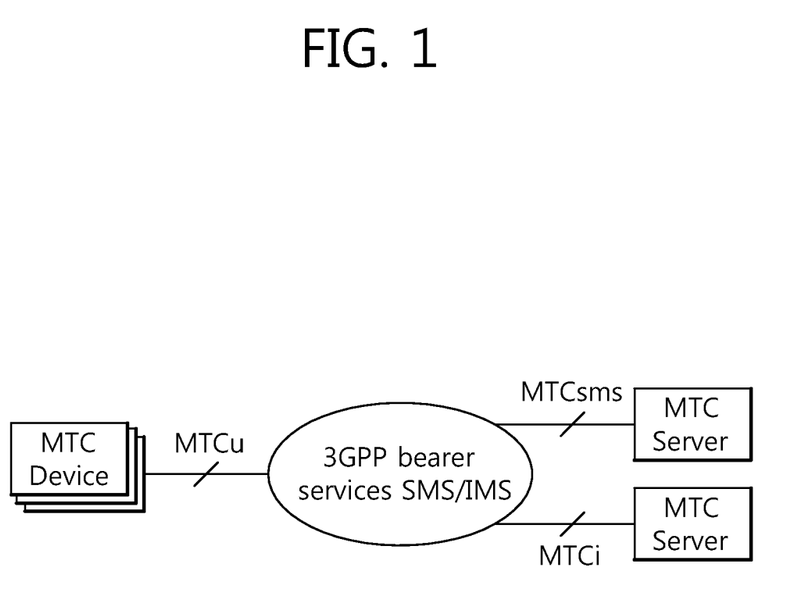
FIG. 1 is a conceptual diagram illustrating a 3GPP service model for MTC support.

FIG. 1 is a conceptual diagram illustrating a 3GPP service model for MTC support.

In order for MTC support, it is defined that communication is made via a PS network in the GSM/UMTS/EPS of the 3GPP standard but the present invention describes how to apply for a CS network. Definition on a network structure in the current technical specifications suggests the use of the existing bearer of the 3GPP. A method of using short message service (SMS) in order to exchange data between an MTC device and an MTC server is suggested as one of an alternative solution. Because of the nature of MTC application, the use of SMS is suggested in consideration that a small amount of digital data such as metering information or product information become its target, and in that way, existing SMS and IMS based SMS supports are available. Referring to FIG. 1, MTCsms is a data exchange interface through existing SMS, and MTCi is a data exchange interface for 3GPP bearer service and IMS.

Hereinafter, typical congestion state control (such as overload control or congestion control) in MTC service will be described.

An example of the case that a congestion state occurs in MTC is as follows: when incorrect functions of an MTC server or MTC application program are performed; when an external event causing a large number of MTC devices to access occurs; when a specific program is configured to operate repeatedly at a specific predetermined time. In such cases, it is very difficult to implement an MTC application program to operate in reality in linkage with a core network. This is because nodes (SGSN/MME/PGW, etc) in a core network are easily damaged by traffic concentrating data.

Accordingly, a method of controlling a congestion state caused by typical core network nodes is as follows.

A) A network node may deny a specific access. The limit standard for denying the access is available according to an APN or MTC group. Or, an MTC device may access a network node only at a predetermined time. However, if there is a congestion state, a network node transmits back off time to an MTC device, so that the network node provides to the MTC device information that prevents an access of the MTC device during that period. At this point, the network node may set back off time through a randomization method.

However, when a control is made on a specific APN or group, a state may be normal in a core network but a congestion state may occur in a specific base station area. Additionally, the performance of the randomization is determined according to a range of an applied time relating to an access between an MTC device and a core network. At this point, if the range of the applied time is short, randomization effect becomes less and this is due to peak. On the other hand, if the range of the applied time is too long, MTC service may be received past the intended time. Additionally, if a new target comes in, an entire calculation is needed again. In this case, since delay time needs to be sent to each MTC device (that is, a terminal) again, large signaling overhead is an issue. Furthermore, if delay time is not sent to an MTC device, this affects performance in terms of technical limitations.

B) Before an MTC device is used at a predetermined time, a position updating process of TAU/RAU is performed on a cell that the MTC device belongs. However, this is to register an accurate position registration before use due to long-term no use. In this case, since it is a long-term off state, position information needs to be updated during an access. This may not be the solution of the fundamental problem.

C) An access start time that an MTC device accesses a network node within a predetermined time is randomized. This is to prevent traffic from concentrating at a specific time. This method may trigger an MTC server or an MTC device. However, when an MTC server or an MTC device is triggered, congestion may occur because it does not take a 3GPP network situation into account.

In this case, it is very difficult to take a core network situation into account and even if it has the effect for a short time, since it does not consider future events to occur, errors are accumulated, so that it is likely to affect the future situation. Accordingly, according to a configuration of an MTC server or an MTC device, a congestion situation may be caused. Additionally, when a new target comes in, this may cause the technical limitation such as the above A).

SUMMARY OF THE INVENTION

The congestion state situation may occur in each core network node such as a base station, an MME, and a gateway (GW). At this point, congestion occurs in a specific base station at a specific time or a unit of a specific node at a specific time. Additionally, management functions for complementing the technical issues on each congestion state of the above mentioned A) to C) need to be applied to a core network or a base station, so that they should be supported as functions of a 3GPP network. Accordingly, the present invention provides a method of effectively applying a congestion state control in a 3GPP network.

In an aspect, a method of controlling congestion in a mobile communication system is provided. The method includes:
(a) receiving, by a core network node, subscription information on terminals and congestion control information from a registration information server; (b) receiving, by the core network node, an access request from the terminals; (c) when the access request is received from the terminals, rescheduling, by the core network node, traffic on the terminals in consideration of the received subscription information and congestion control information and a situation of the core network; and (d) transmitting, by the core network node, the rescheduled result to the terminals.

The step (a) may further include scheduling, by the core network node, the traffic on the terminals to be uniformly distributed by using the subscription information on the terminals and the congestion control information.

In order to control a congestion state of the traffic:
the scheduling of the traffic may include uniformly distributing scheduled traffic among the traffic of the terminals and then uniformly distributing unscheduled traffic among the traffic on the terminals.

The step (c) may further include:
generating, by the core network node, a result value of the rescheduling that indicates an allowed time of the terminals.

The result value of the rescheduling may be:
a "recalculated time interval" parameter, and a value of the "recalculated time interval" parameter may be a changed value of an "Allowed time interval" parameter during the rescheduling of the traffic.

The received subscription information and congestion control information may comprise:
at least one of an "international mobile subscriber identity (IMSI)" parameter, a "machine type communication (MTC) device indicator" parameter, a "Group id" parameter, an "Allowed time interval" parameter, an "Allowed data capacity" parameter, and a "priority" parameter.

The step (b) may further include:
confirming, by the core network node, whether the access request received from the terminals includes an "MTC device indicator"; and when the access request includes the "MTC device indicator", performing, by the core network node, a rescheduling procedure on the traffic on the terminals,
wherein the "MTC device indicator" is a parameter indicating that each of the terminals is an MTC device.

In another aspect, a method of controlling congestion in a mobile communication system is:
a method of controlling a congestion state due to traffic of MTC devices in a mobile communication system supporting machine type communication (MTC) service, the method comprising:
in order to uniformly distribute the traffic of the MTC devices, scheduling, by a core network node, the traffic of each of the MTC devices by a time slot unit by using subscription information on each of the MTC devices and congestion control information;
when there is an access request from the MTC devices, rescheduling, by the core network node, the traffic of each of the MTC devices in consideration of a network situation and the scheduled result; and
on the basis of the rescheduled result, when an allowed time that the MTC devices access a core network is changed, notifying, by the core network node, the allowed time to the MTC devices.

The access request of the MTC devices may use:
an attach message on a core network, a tracking area update (TAU) request message, or a routing area update (RAU) request message.

The allowed time may be delivered to the MTC devices:
by using the "recalculated time interval" parameter that the core network node generates during the rescheduling of the traffic.

The notifying of the allowed time uses:
an attach accept message, a tracking area update (TAU) allow message, or a routing area update (RAU) message.

According to the present invention, in a mobile communication system supporting MTC service, a traffic congestion situation in a core network is prevented so as to provide smooth traffic and control the flow of data communication, so that the quality of service and efficiency of resource utilization can be improved.

DESCRIPTION OF EXEMPLARY EMBODIMENTS

The present invention is applied to a mobile communication system using machine type communication (MTC). However, the present invention is not limited thereto, and thus may be applied to the next generation mobile communications and other wired/wireless communications that the technical idea of the present invention may be applied.

Since the present invention has various modifications and diverse embodiments, only specific embodiments are exemplarily illustrated in the drawings and will be described in detail. However, this is not construed as being limited to the specific embodiments but, rather, it is intended that the present invention covers all modifications, equivalents, and substitutes within the ideas and technical scopes of the present invention.

Although terms like a first and a second are used to describe various components, the components are not limited to the terms. The terms are used only to differentiate one component from another one. For example, a first component may be referred to as a second component and vice versa, without departing from the scope of the present invention. The term and/or includes any and all combinations of one or more of the associated listed items.

When one component is referred to as being "connected" or "accessed" to another component, it should be understood that the former may be directly connected or accessed to the latter or may be connected or accessed to the latter via an intervening another component. However, when one component is referred to as being "directly connected" or "directly accessed" to another component, it should be understood that there are no other intervening components.

The terms used in this specification are used only to describe specific embodiments and are not intended to limit the present invention. The terms of a singular form may include plural forms unless referred to the contrary. In this present invention, the term of "include" or "has" specifies that there are features, numbers, steps, operations, components, parts, or combinations thereof in the specification but does not exclude one or more features, numbers, steps, operations, components, parts, or combinations thereof.

Unless otherwise defined, all terms used herein and including technical and scientific terms have the same meaning as those generally understood by those skilled in the art. Terms defined in commonly used dictionaries should be interpreted as having the same meanings as those in the context of related technologies, and unless clearly defined, are not interpreted as ideally or excessively formal meanings.

A terminal according to the present invention refers to all devices performing the technical features of the present invention. That is, a mobile communication terminal for performing an MTC service function according to the present invention (for example, a pacemakers, a vending machine, a power meter, an air pollution level meter, etc.) is a user equipment (UE), and beside that, includes human oriented devices (for example, mobile phones, cell phones, DMB phones, game phones, camera phones, smart phones, etc) and also notebook computers, desktop computers, laptop computers, palmtop computers, personal digital assistants (PDAs), white goods, etc. in a broad sense.

Hereinafter, preferred embodiments of the present invention will be described in more detail with reference to the accompanying drawings. While described with reference to the attached drawings, like reference numerals refer to like elements and their overlapping description will be omitted.

In the 3GPP mobile communication system supporting an MTC function, data communication, in which an MTC device (that is not involved by a human operation) is involved, operates in a predetermined state. When this data communication is driven into a specific time, data communication (or traffic) may undergo a congestion state, or may affect another form of communications (for example, human-human communication).

That is, the present invention is based on an issue that data communication becomes in a congestion/overload state in the mobile communication system supporting MTC service. The present invention suggests functions and operations, which may resolve a congestion state occurring in relation to MTC data communication. Therefore, the present invention prevents a congestion state of data communication in advance, and appropriately distributes the data communication when data communication becomes a congestion state, thereby efficiently utilizing radio resources or resources of a core network.

The basic concept of the present invention is as follows: 1) parameters (or information) for controlling a congestion state of data communication are registered to an MTC server; 2) after a network node (for example, MME, MSC, SGSN, etc) receives the parameters (for example, tentatively named "Allowed time interval", or tentatively named "Allowed data capacity", etc), it analyses (or uses) the received parameters in order to reschedule each traffic of data communication on terminals (that is, the MTC device); 3) a core network node generates a "recalculated time interval" parameter for controlling traffic congestion through the rescheduling process and then delivers it to MTC devices; 4) each terminal accesses the core network according to a value of the "recalculated time interval" parameter; 5) accordingly, through the rescheduling process of the traffic of the core network node, data traffic that may be driven into the specific time is efficiently distributed, so that congestion or network overload may be controlled.

In order to realize the basic concept of the present invention, first, the present invention newly defines the parameters necessary for controlling a congestion state; second, the present invention provides methods of a network node to distribute traffic for each terminal on a time axis by a time slot unit and schedule it by using the parameters.

Hereinafter, in a mobile communication system supporting MTC service, the basic premise for controlling a congestion state is as follows.

An MTC user may set a usage time of an MTC device;
A subject starting MTC related data transmission may be an MTC device or an MTC server;
A RAN or a core network node (MME/SGSN/MSC) may adjust a usage time of an MTC device in order for congestion control. At this point, information that may be referenced for congestion control of data communication includes set time, a state (position and capacity) of an access cell, subscriber information (amount of allowed data and group IP), etc. Additionally, such information may be stored in a subscriber DB.

The type of traffic or the subject of congestion control (that is, the degree of data communication congestion) is divided into scheduled traffic and unscheduled traffic.

Figure 2:
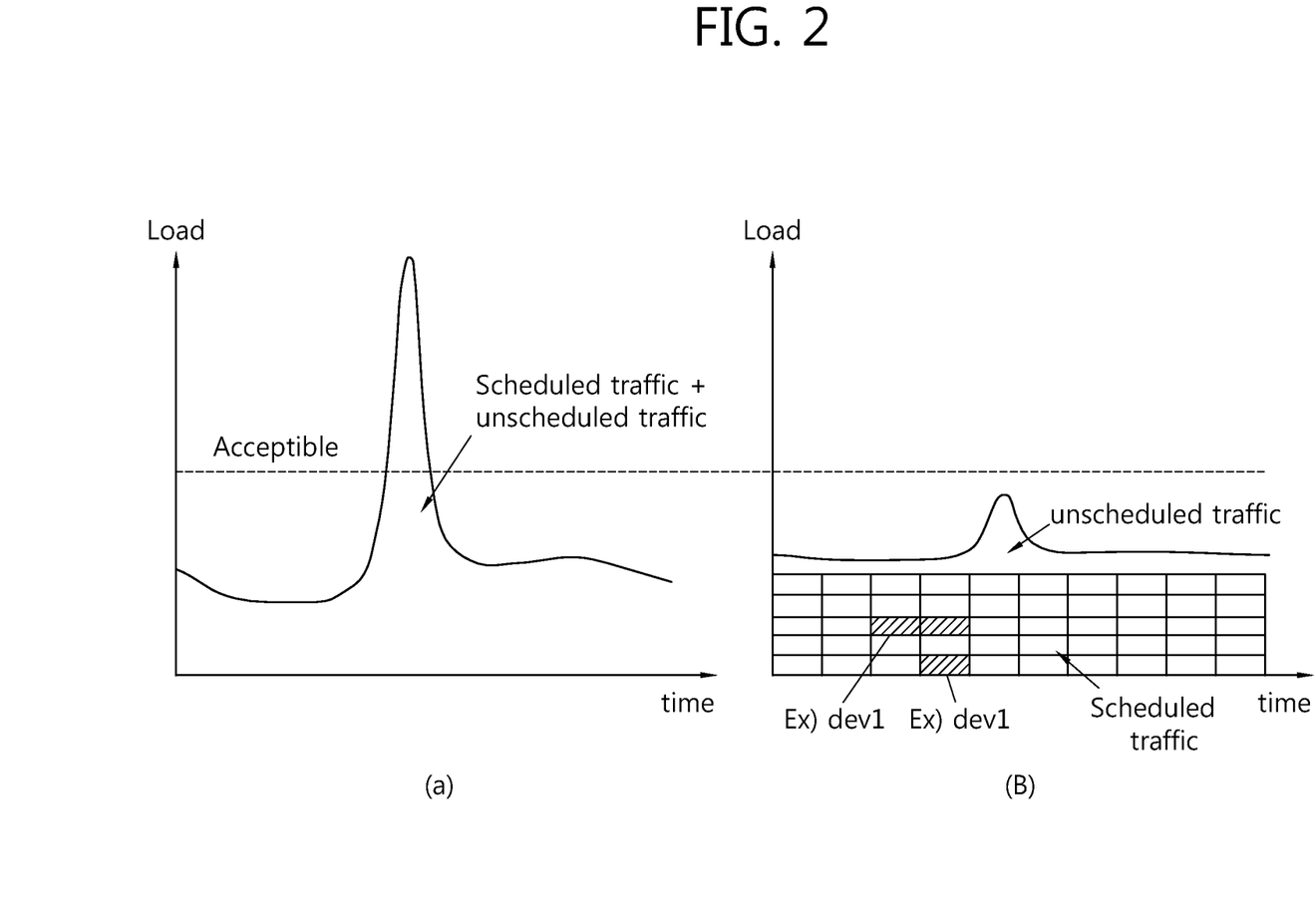
FIG. 2(a) and FIG. 2(b) are views illustrating the type of traffic and scheduling method.

FIG. 2(a) and FIG. 2(b) are views illustrating the type of traffic and scheduling method. FIG. 2 is a graph illustrating load (or traffic) of data changed according to a time. As shown in FIG. 2, traffic that a system supporting MTC may process at each specific time is indicated with a dotted line. Moreover, according to the premise of FIG. 2, traffic is calculated on the basis of the load of data caused by a plurality of MTC devices.

As shown in FIG. 2, there are scheduled traffics and unscheduled traffics.

Especially, as shown in FIG. 2(a), as the total traffic (that is, the sum of scheduled traffics and unscheduled traffics) is explosively increased at a specific time, it exceeds a threshold that the mobile communication system supporting MTC service itself may accommodate, so that a peak occurs. As shown in FIG. 2(a), the traffic congestion occurs at the timing of the peak occurrence.

Additionally, FIG. 2(b) corresponds to the case that the scheduled traffic is uniformly distributed on the time axis. That is, with respect to scheduled traffic as shown in FIG. 2(b), as a system allocates a time slot for data communication to MTC devices, the scheduled traffic is uniformly distributed on the time axis not to be congested at a specific time. For example, under the assumption that an MTC device 1 and an MTC device 2 are configured as an MTC device in the system, when the MTC device 1 has a large data traffic, two time slots are allocated to the MTC device 2, and one time slot is allocated to the MTC device 2 having a relatively small data traffic. At this point, the size of the time slot may be determined by considering resources and system performances through the system. There may be unscheduled traffics besides the scheduled traffics in FIG. 2(b), and the unscheduled traffics may be distributed randomly according to a time. Accordingly, after the scheduled traffics are allocated according to a time for uniform distribution in FIG. 2(b), it is observed that the total traffic (that is, the sum of the scheduled traffics and the unscheduled traffics) has a low traffic peak (the traffic at the timing of when a communication congestion state may occur) at a specific time compared to FIG. 2(a).

In more detail, if the scheduled traffics and the unscheduled traffics are not distributed as shown in FIG. 2(a), the total traffic may be driven at a specific time and thus a congestion state may occur. On the other hand, as shown in FIG. 2(b), when the scheduled traffics are allocated in advance on the time axis in order for uniform distribution, even if a peak occurs as shown in FIG. 2(b), this may correspond to a level that the system may allow (accept).

That is, the present invention is provided in consideration of a traffic situation shown in FIG. 2(a) and FIG. 2(b). Additionally, the present invention provides controls to prevent a congestion state of data communication by adjusting the traffic of MTC data communication.

Hereinafter, a system block diagram of FIG. 3 will be described based on the above premise.

Figure 3:
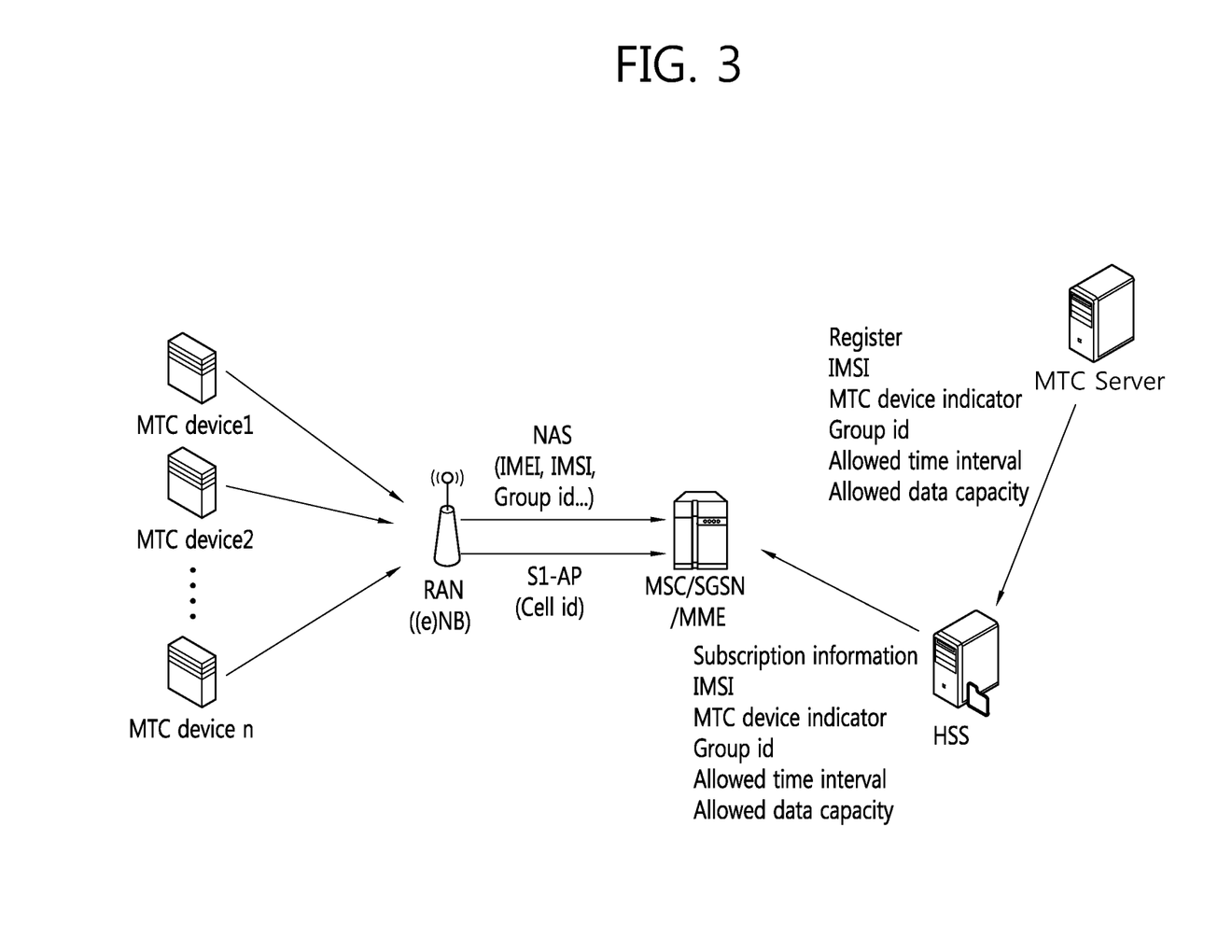
FIG. 3 is a block diagram illustrating a core network that transmits delivery parameters to control a congestion state of data communication according to an embodiment of the present invention.

FIG. 3 is a block diagram illustrating a core network that transmits delivery parameters to control a congestion state of data communication according to an embodiment of the present invention.

A node network node performing a congestion control in a core network may include an MSC, an SGSN, or an MME. Here, the MSC is a network node used for a circuit switched (CS) access in a 2G or 3G network. The SGSN is a network node used for a packet switched (PS) access in a 2G or 3G network. Additionally, the MME is a network node used for a PS access in an EPS network.

In order to control traffic congestion according to the present invention, as a prerequisite condition, subscription information on the HLR or HSS (that is, subscription information on MTC service) needs to be stored in a user DB of the MTC device. At this point, the subscription information includes information (that is, parameters) used for congestion control. For example, as shown in FIG. 3, the information used for congestion control includes an "Allowed time interval" parameter and an "Allowed data capacity" parameter. Moreover, the parameters used for such congestion control are registered to the first MTC server by a user of a terminal (that is, an MTC device).

Also, when a terminal (that is, an MTC device) is attached to or registered to a core network, the core network receives the subscription information from an HLR or HSS.

A core network node schedules traffics of MTC devices by using the delivered subscription information in order to control a congestion state. At this point, the core network node performs scheduling on the basis of the delivered subscription information, and especially may schedule traffics in consideration of a priority of each traffic, and network situations and conditions. For example, the core network node may edit a time interval that allows data communication for a specific MTC device or MTC devices of a specific group by editing the value of the "Allowed time interval" parameter included in the subscription information (this corresponds to a rescheduling process that the core network node performs in FIG. 7).

Figure 4:
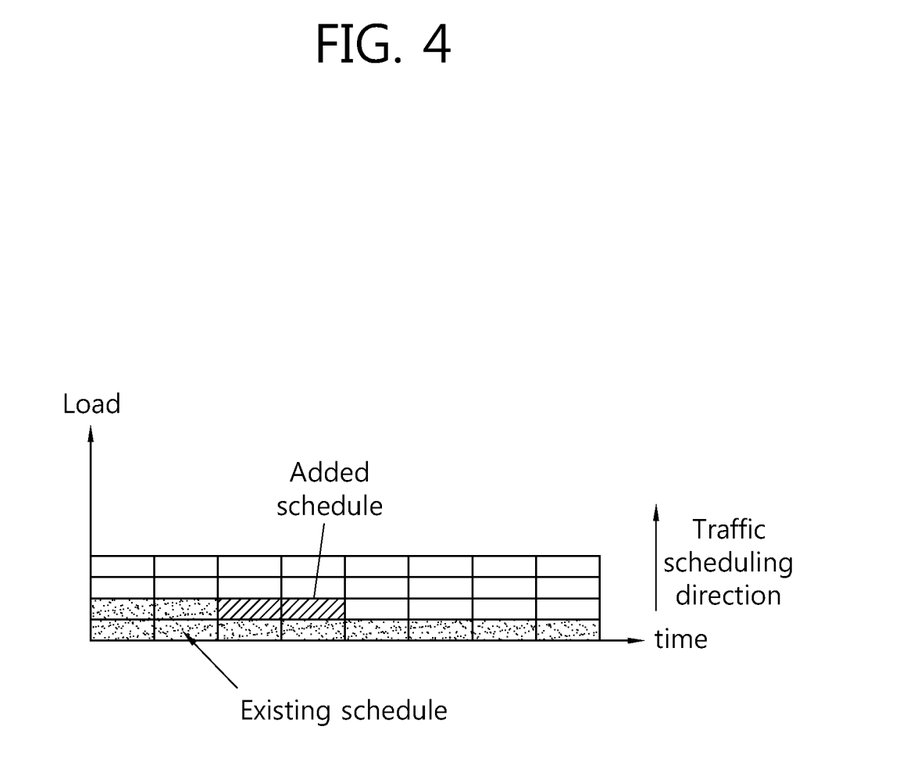
FIG. 4 is a view of scheduling traffic to be uniformly distributed on a time axis in order to prevent a congestion state of data communication.

Additionally, as shown in FIG. 4, the core network node performs scheduling to uniformly distribute traffics on the time axis, in order to prevent a congestion state of data communication. At this point, the core network node performs scheduling in uniform distribution in consideration of at least one of 'the position where an MTC device is connected or the positions where MTC devices of a specific group are connected', 'group id', and, 'Allowed time interval', and 'an amount of allowed data (load)' according to a network situation. Especially, as shown in FIG. 4, the data traffic (load) between the core network node and the MTC devices is scheduled in a gradually stacking way like a scheduling direction. At this point, the core network node schedules to allocate the data traffic (load) for MTC devices on the time axis by a time slot unit in order for uniform distribution. Additionally, the core network node may add or delete a data traffic (that is, a shaded portion as "added schedule" in FIG. 4) according to a network situation (for example, when an operating policy or predetermined condition is satisfied) and the request of the MTC devices, in addition to the existing scheduled data traffic (that is, a slashed portion as "existing schedule" in FIG. 4). As shown in FIG. 4, in order to randomly and uniformly distribute data traffic (load) for MTC devices, the core network node performs scheduling. Thus, when data traffic for a specific MTC device is added or deleted, an impact on an existing configured scheduling may be minimized (that is, a traffic congestion state at a specific time slot may be prevented).

Hereinafter, information (or parameters) that a core network node uses to control a congestion state of traffic will be described with reference to Table 1.

TABLE 1

| Parameter |
| --- |
| IMSI |
| MTC device indicator |
| Group id |
| Allowed time interval |
| Allowed data capacity |
| APN |

Parameters shown in Table 1 just correspond to one example of the present invention, and do not limit the present invention. Hereinafter, referring to Table 1, parameters used for controlling a congestion state of traffic will be described.

"IMSI" is international mobile subscriber identity, and corresponds to an identifier consisting of a unique number for identifying a mobile terminal;

"MTC device indicator" parameter is a parameter (or an indicator) indicating that a terminal is an MTC device;

"Allowed time interval" is a parameter indicating a communication (access) usage time allowed for an MTC device to communication to a core network. For example, "Allowed time interval" may be a time value allowing an MTC device to communicate with a core network only for a specific time interval, a set value for allowing communication after a specific time, or a set value for allowing communication before a specific time.

"Allowed data capacity" is a parameter meaning allowed data usage that an MTC device accesses and communicates with a core network.

Moreover, in the case of an APN, another policy may be applied to a specific APN. The "Group id" parameter indicates a group that a terminal belongs and "Allowed time interval" or "Allowed data capacity" may be set in association with a specific "Group id" according to an embodiment. That is, the same "Allowed time interval" or "Allowed data capacity" may be applied to the terminals (that is, an MTC device) having the same "Group id". For example, the terminal (that is, the MTC device) having the same "Group id" may access or communicate with a core network for an interval that "Allowed time interval" indicates. At this point, if the size of a group is large, since accesses of the MTC devices belonging to the group are simultaneously concentrated, as shown in FIG. 4, by appropriately relocating data traffic (that is, uniformly distributing data traffic) for an operating time, the occurrence of a traffic congestion state may be controlled.

A user of a terminal registers to an MTC server information including the parameters of Table 1, that is, as so-called traffic congestion control information" (hereinafter, for convenience of description, referred to as "congestion control information"), and the MTC server delivers it to an HLR and/or an HSS, one component of a core network. Here, an HLR and/or an HSS, as a network entity configured in a core network, is a registration information server corresponding to a database storing subscriber information. When MTC devices are attached to a core network or MTC devices request a core network node, such congestion control information is delivered from an HLR and/or ah HSS to a core network node.

Hereinafter, a method of a core network node to control traffic congestion state not to occur by using congestion control information as shown in Table 1.

The core network node receives "congestion control information" from an HLR and/or an HSS, and analyzes it in order to divide each traffic corresponding to the data communication of MTC devices into two types (that is, scheduled traffic and unscheduled traffic), and then, applies scheduling.

That is, the core network node preferentially performs scheduling on scheduled traffic to be in the maximum uniform distribution form, so that an amount of data (load), that is, traffic, is not concentrated at a specific time. At this point, the core network node performs scheduling by using "a set time", "a state of an access cell (for example, the position and capacity of a cell)", "subscriber information (for example, an amount of allowed data and Group id)", "gateway (GW) type", and "an APN", besides the information as shown in Table 1. Additionally, in the congestion control according to the present invention, a policy may be applied specifically according to a GW or an APN.

Moreover, in the case of unscheduled traffic, a core network node may respond adaptively according to a network situation. For example, when a traffic congestion situation occurs, a core network node may reject the unscheduled traffic requested from a specific MTC device (or MTC devices belonging to a specific group), or may notify a retry time to the specific MTC device (or MTC devices belonging to a specific group), so that a request is made again after the traffic congestion state is resolved.

Figure 5:
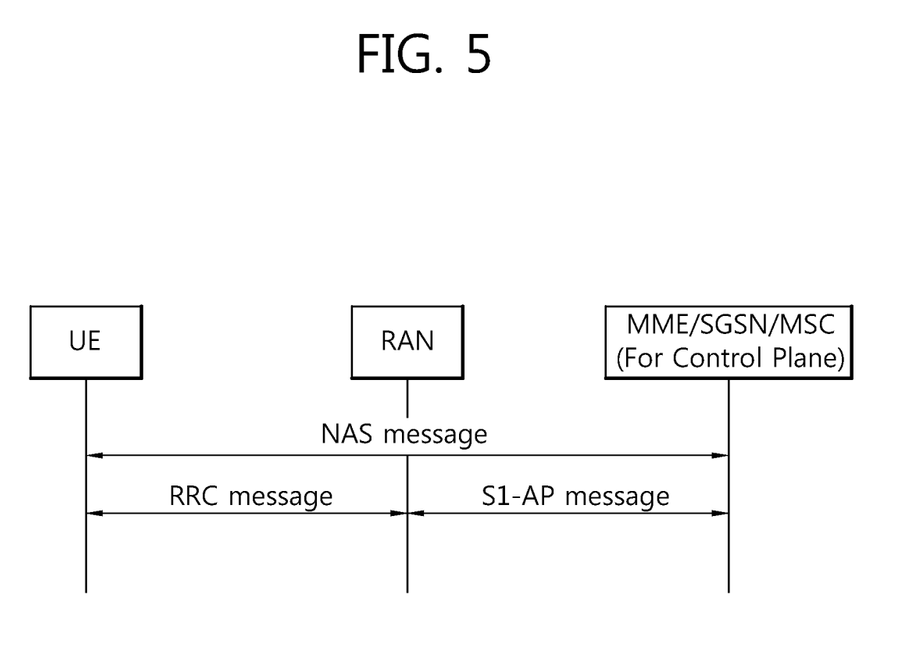
FIG. 5 is a signal flowchart illustrating signaling between a terminal (that is, an MTC device), a radio access network (RAN), and a core network node (MME/SGSN/MSC) according to an embodiment of the present invention.

FIG. 5 is a signal flowchart illustrating signaling between a terminal (that is, an MTC device), a radio access network (RAN), and a core network node (MME/SGSN/MSC) according to an embodiment of the present invention.

As shown in FIG. 5, an RRC message is used in a radio access section between a UE (that is, an MTC device) and a radio access network (RAN), and a S1-AP message is used in a radio access network (RAN) and a core network node (MME/SGSN/MSC) section. Moreover, an NAS message is used in a UE and a core network node (MME/SGSN/MSC) section. At this point, the NAS message may be carried as a specific parameter in the RRC message or the S1-AP message and transmitted.

Figure 6:
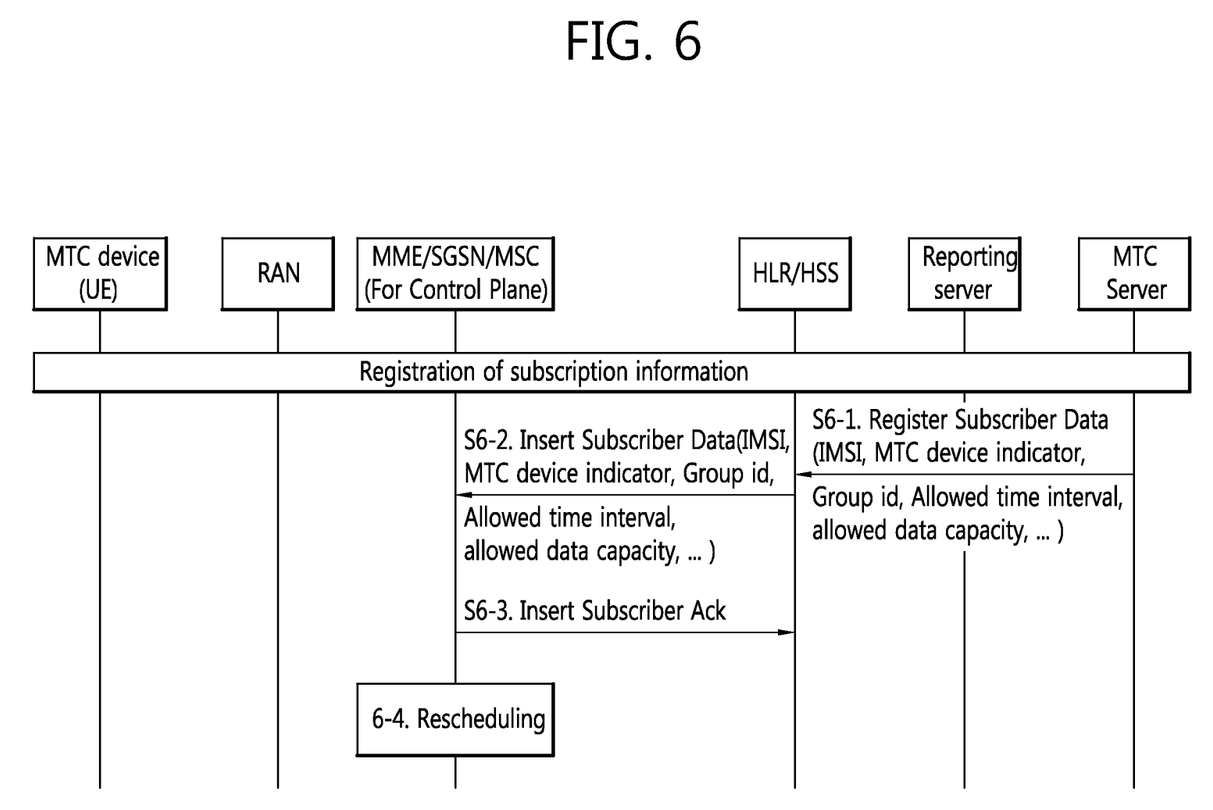
FIG. 6 is a signal flowchart illustrating a process for registering traffic congestion control information according to an embodiment of the present invention.

FIG. 6 is a signal flowchart illustrating a process for registering traffic congestion control information according to an embodiment of the present invention.

Subscription information that a user of an MTC device (that is, a terminal) registers in an MTC server is delivered to an HLR/HSS (S6-1). Moreover, an MTS server exists outside the 3GPP core network. At this point, in addition to the subscription information, congestion control information, which a core network node is to use in order to control a traffic congestion state, may be registered. For example, subscription information and congestion control information are shown on the above Table 1. That is, the subscription information includes an "IMSI" parameter, an "MTC device indicator" parameter, and a "Group id" parameter. Additionally, the congestion control information delivers an "Allowed time interval" parameter, and an "Allowed data capacity" parameter. Additionally, a "priority" may be added as congestion control information, for example. The "priority" parameter may be defined as a parameter indicating which traffic of a specific MTC device is prioritized for scheduling when a core network node performs rescheduling in consideration of congestion control information and network situation, The subscription information and the congestion control information are delivered from an HLR/HSS to a core network node (MME/SGSN/MSC) by using an insert subscription data message (S6-2). Also, the core network node delivers a response message (that is, insert subscription Ack in FIG. 6) on the insert subscription data message to the HLR/HSS (S6-3).

The core network node analyzes the subscription information and the congestion control information included in the insert subscription data message, and performs rescheduling on the traffic of the MTC devices on the basis of the analyzed subscription information and congestion control information.

At this point, the core network node reschedules the traffic of the MTC devices to be uniformly distributed in consideration of the congestion control information and network situations.

Moreover, a core network generates a parameter (a so-called recalculated time interval) indicating an available time that MTC devices (or MTC devices belonging to a specific group) access (or connect to) the core network, in order to control the traffic according to a network situation by using the congestion control information (especially, an "Allowed time interval" parameter and, "Allowed data capacity"). That is, the "recalculated time interval" parameter is delivered to terminals (that is, MTC devices) (or terminals subscribed to a specific group) in a core network. A terminal receives the "recalculated time interval" parameter and connects to the core network according to a time adjusted or changed by the parameter value (that is, this corresponds to S7-3 of FIG. 7).

Hereinafter, referring to FIG. 7, a rescheduling process that a core network node performs will be described in more detail.

Figure 7:
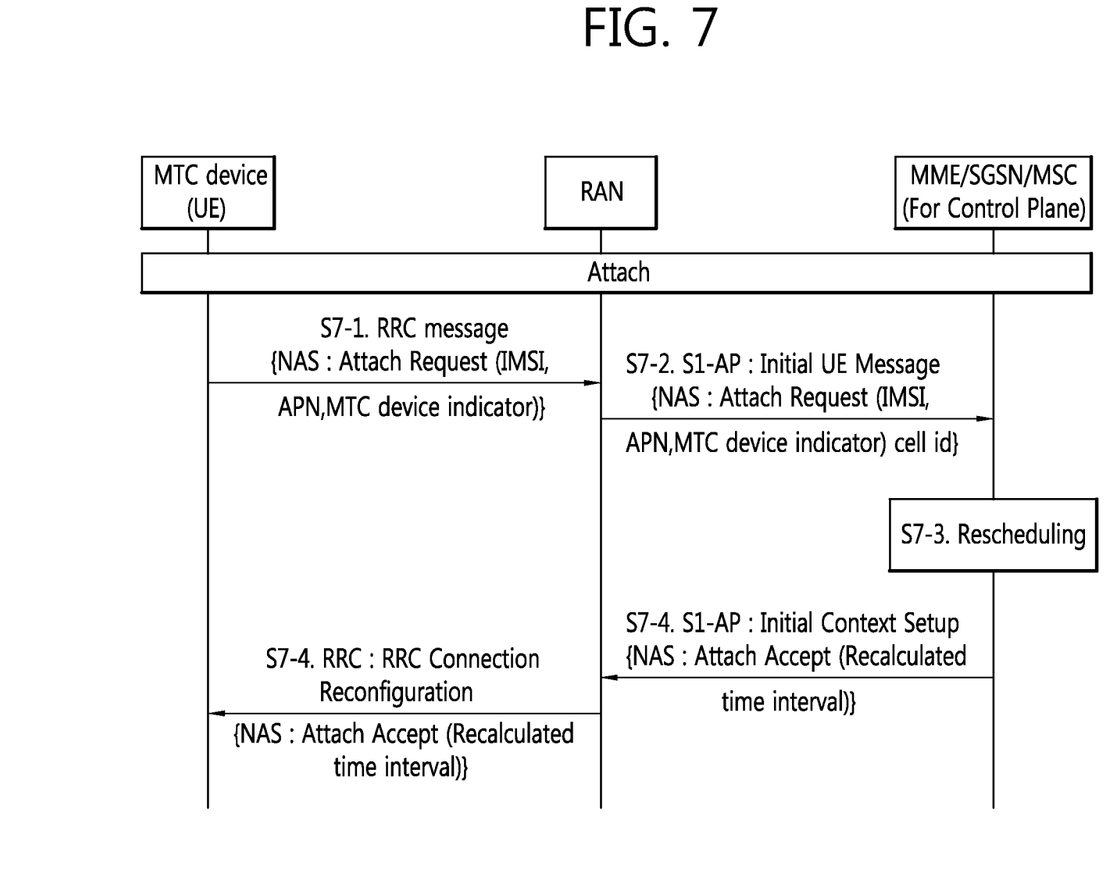
FIG. 7 is a signal flowchart illustrating a method of controlling traffic congestion according to an embodiment of the present invention.

FIG. 7 is a signal flowchart illustrating a method of controlling traffic congestion according to an embodiment of the present invention.

In FIG. 7, a core network node, as a network entity responsible for congestion control, is an MSC, an SGSN, or an MME. In FIG. 7, the core network node notifies an available time (for convenience, allowed time) for core network connection to the MTC devices generated through a rescheduling process. The timing at which the core network node notifies the "allowed time" to the MTC device is, for example, when the MTC devices are attached to the core network, while a position registration process such as TAU or RAU is performed, when they are in a connected mode. Additionally, FIG. 7 corresponds to the embodiment of when the MTC device is attached to the core network. The embodiment of FIG. 7 is based on when there is there is one terminal (that is, one MTC device) for convenience of description. Accordingly, there may be a plurality of terminals connectable to the core network, or terminal grouped into one specific group may be connected to the core network node.

Referring to FIG. 7, in order to attach to the core network, a terminal (that I, an MTC device) sends an RRC message to a radio access network (RAN) (S7-1). At this point, the RRC message includes an "IMSI", i.e. a unique identifier of a terminal, an "MTC device indicator" indicating that a terminal itself is an MTC device, and an APN. A radio access network (RAN) delivers information on a terminal requesting attach (that is, the "IMSI", the "MTC device indicator" and, the APN) and cell information on the RAN (that is, the cell id in FIG. 7) to the core network node by using the S1-AP protocol message (that is, the Initial UE Message in FIG. 7) (S7-2). The cell information (that is, the cell id in FIG. 7) is information notifying that a terminal accesses which cell. The information of when the terminal is attached to the core network is carried in an NAS message, and transmitted.

The core network node receives the message in S7-2, and analyzes the "IMSI" and the "MTC device indicator" included in the received message so that it recognizes that the terminal is the MTC device.

The core network node may not change existing data or may change (or edit) a schedule of traffic in a uniform distribution form within a minimum range. That is, the core network node reschedules traffic (data communication) on terminals (that is, MTC devices) by using the received information in S6-2 of FIG. 6 (the "IMSI" parameter, the "MTC device indicator" parameter, or the "Group id" parameter, etc) and congestion control information (that is, as shown in Table 1, the "Allowed time interval" parameter, the "Allowed data capacity" parameter, and the "priority" parameter) or considering a network situation. At this point, the core network node generates information on the allowed time to be delivered to each terminal, as a rescheduled result. Information on the allowed time is a so-called "recalculated time interval" parameter. Furthermore, besides the subscription information on a core network node and congestion control information, in consideration of at least one of a "cell id" delivered from an RAN, a state (position and capacity) of an access cell, a gateway (GW) type, and an APN, a rescheduling process may be performed.

Additionally, the core network node may use at least one piece of information among examples of the subscription information and the congestion control information. For example, when the allowed time to the core network is rescheduled with respect to terminals corresponding to a specific group, the specific group may be designated as the "Group id" parameter, and the allowed time may be set as the value of the "recalculated time interval" parameter. That is, although the initial allowed time to a terminal is the value set in the "Allowed time interval" parameter, if the allowed time of the terminals belonging to a specific group is edited (changed or rescheduled) during the rescheduling process of the core network node (that is, S7-3), the edited allowed time may be delivered to the terminals belonging to the specific group, as the "recalculated time interval" parameter (S7-4 and S7-5). That is, the core network node includes the "recalculated time interval" parameter in an attach accept message and delivers it to the terminal via a RAN.

Additionally, according to another embodiment of the present invention, when an allowed time for a terminal to access the core network is not necessary during the rescheduling process of the core network node (S7-3), the "Allowed time interval" parameter (that is, the allowed time) among congestion control information received in S6-2 of FIG. 6 is delivered to a terminal. Accordingly, the terminal accesses the core network during the allowed time that the received "Allowed time interval" parameter value indicates.

If core network traffic is currently in a congestion situation, the core network node transmits a reject message on the attach request (S7-1 and S7-2) of a terminal, or notifies an attach retrial time to a terminal (not shown).

As mentioned above, FIG. 7 illustrates a method of delivering congestion control information when a terminal sends an attach request. However, besides that, the present invention may be realized in a tracking area update (TAU) or a routing area update (RAU) procedure. In this case, a TAU request message of a RAU request message instead of an attach request message may be used, a TAU accept message or a Rau accept message instead of an attach accept message may be used.

Additionally, the method described until now according to the present invention may be realized with software, hardware or a combination thereof. For example, the method according to the present invention may be stored in a storage medium (for example, memory, flash memory, hard disk, etc. in a mobile terminal), and may be realized with codes or commands in a software program executed by a processor (for example, a mobile terminal internal micro processor).

Although the present invention has been described with reference to exemplary embodiments in the drawings, this is merely exemplary and thus a person having ordinary skill in the art will understand from the above that various modifications and other equivalent embodiments are also possible.

Hence, the real protective scope of the present invention shall be determined by the technical scope of the accompanying claims.

What is claimed is:

1. A method of controlling congestion in a mobile communication system, the method comprising:
receiving, by a core network node, subscription information on terminals and congestion control information from a registration information server;
receiving, by the core network node, an access request from the terminals;
when the access request is received from the terminals, rescheduling, by the core network node, traffic on the terminals in consideration of the received subscription information and congestion control information and a situation of the core network;
generating, by the core network node, a result value of the rescheduling that indicates an allowed time of the terminals, wherein the result value of the rescheduling is a first parameter, and a value of the first parameter is a changed value of a second parameter during the rescheduling of the traffic; and
transmitting, by the core network node, the rescheduled result to the terminals.

2. The method of claim 1, further comprising:
scheduling, by the core network node, the traffic on the terminals to be uniformly distributed by using the subscription information on the terminals and the congestion control information.

3. The method of claim 2, wherein in order to control a congestion state of the traffic, the scheduling of the traffic comprises uniformly distributing scheduled traffic among the traffic of the terminals and then uniformly distributing unscheduled traffic among the traffic on the terminals.

4. The method of claim 1, wherein the received subscription information and congestion control information comprise at least one of an "international mobile subscriber identity (IMSI)" parameter, a "machine type communication (MTC) device indicator" parameter, a "Group id" parameter, an "Allowed time interval" parameter, an "Allowed data capacity" parameter, and a "priority" parameter.

5. The method of claim 1, further comprising:
confirming, by the core network node, whether the access request received from the terminals includes an "MTC device indicator"; and
when the access request includes the "MTC device indicator", performing, by the core network node, a rescheduling procedure on the traffic on the terminals,
wherein the "MTC device indicator" is a parameter indicating that each of the terminals is an MTC device.

6. The method of claim 1 wherein the first parameter is a "recalculated time interval" parameter, and the second parameter is an "allowed time interval" parameter.

7. A method of controlling congestion in a mobile communication system, the method comprising:
receiving, by a core network node, subscription information on terminals and congestion control information from a registration information server;
receiving, by the core network node, an access request from the terminals;
if the access request is received from the terminals and if the access request includes a machine type communication (MTC) device indicator indicating that each of the terminals is an MTC device, rescheduling, by the core network node, traffic on the terminals in consideration of the received subscription information and congestion control information and a situation of the core network;

generating, by the core network node, a result value of the rescheduling that indicates an allowed time of the terminals, wherein the result value of the rescheduling is a "recalculated time interval" parameter, and a value of the "recalculated time interval" parameter is a changed value of an "allowed time interval" parameter during the rescheduling of the traffic; and transmitting, by the core network node, the rescheduled result to the terminals.

8. The method of claim 7, further comprising:

scheduling, by the core network node, the traffic on the terminals to be uniformly distributed by using the subscription information on the terminals and the congestion control information.

9. The method of claim 8, wherein in order to control a congestion state of the traffic, the scheduling of the traffic comprises uniformly distributing scheduled traffic among the traffic of the terminals and then uniformly distributing unscheduled traffic among the traffic on the terminals.

10. The method of claim 7, wherein the received subscription information and congestion control information comprise at least one of an "international mobile subscriber identity (IMSI)" parameter, an "MTC device indicator" parameter, a "Group id" parameter, an "Allowed time interval" parameter, an "Allowed data capacity" parameter, or a "priority" parameter.

* * * * *